US011715941B2

(12) United States Patent
Li et al.

(10) Patent No.: US 11,715,941 B2
(45) Date of Patent: Aug. 1, 2023

(54) BACK-TO-BACK TWO-GANG ELECTRICAL BOX

(71) Applicant: HUBBELL INCORPORATED, Shelton, CT (US)

(72) Inventors: Jian Hua Li, Bayside, NY (US); Joseph Nicholas Cretella, Ansonia, CT (US)

(73) Assignee: HUBBELL INCORPORATED, Shelton, CT (US)

(*) Notice: Subject to any disclaimer, the term of this patent is extended or adjusted under 35 U.S.C. 154(b) by 0 days.

(21) Appl. No.: 17/572,041

(22) Filed: Jan. 10, 2022

(65) Prior Publication Data

US 2022/0224091 A1 Jul. 14, 2022

Related U.S. Application Data

(60) Provisional application No. 63/136,127, filed on Jan. 11, 2021.

(51) Int. Cl.
*H02G 3/08* (2006.01)
*H02G 3/14* (2006.01)

(52) U.S. Cl.
CPC ............. *H02G 3/086* (2013.01); *H02G 3/083* (2013.01); *H02G 3/14* (2013.01)

(58) Field of Classification Search
CPC ......... H02G 3/18; H02G 3/086; H05K 5/0021
See application file for complete search history.

(56) References Cited

U.S. PATENT DOCUMENTS

| | | | | |
|---|---|---|---|---|
| 2,932,683 A | | 4/1960 | Flachbarth | |
| 4,240,688 A | | 12/1980 | Sotolongo | |
| 4,470,656 A | | 9/1984 | Moser et al. | |
| 4,958,048 A | * | 9/1990 | Bell | H02G 3/18 174/53 |
| 5,025,944 A | * | 6/1991 | Rodick | H02G 3/125 220/3.9 |
| 7,234,670 B1 | | 6/2007 | Gretz et al. | |
| 10,622,794 B1 | * | 4/2020 | Holleschau | H05B 45/37 |
| 2006/0231282 A1 | | 10/2006 | Greenfield | |
| 2012/0222896 A1 | * | 9/2012 | Haberek | H02G 3/123 174/560 |
| 2018/0048132 A1 | | 2/2018 | Dinh et al. | |
| 2020/0196466 A1 | * | 6/2020 | Fischl | H05K 5/0021 |

(Continued)

OTHER PUBLICATIONS

Gard-N-Post Supports & Enclosures brochure, Arlington, aifittings.com, 2006, pp. 1-12.

(Continued)

*Primary Examiner* — Hung V Ngo
(74) *Attorney, Agent, or Firm* — Dilworth IP, LLC

(57) ABSTRACT

An electrical box including a central housing with a first side opening, a second side opening opposite the first side opening, and a rear opening, each of the first and second side openings configured to receive an electrical or data interface device, a first extension compartment around the first side opening, the first extension compartment including a first door, a second extension compartment around the second side opening, the second extension compartment including a second door, and an exterior cover extending at least partially over the central housing, the first extension compartment, and the second extension compartment.

23 Claims, 15 Drawing Sheets

50 160 181 145 140 152 180 181 182

(56) References Cited

U.S. PATENT DOCUMENTS

2021/0076524 A1* 3/2021 Bala .................... H05K 5/0008
2021/0127508 A1* 4/2021 Wang ................. H04M 1/7246

OTHER PUBLICATIONS

Receptacle Bollard Installation Instructions, B-K Lighting, 2015, pp. 1-2.
Receptacle Bollard Specifications Listing, B-K Lighting, 2020, pp. 1-3.
Wiremold Outdoor Charging Stations brochure and specifications, legrand, www.legrand.us/wiremold, 2016, pp. 1-12.

* cited by examiner

BACK-TO-BACK TWO-GANG ELECTRICAL BOX

FIELD OF THE INVENTION

The present disclosure relates electrical boxes, and more particularly, to a back-to-back electrical box for indoor and outdoor applications.

BACKGROUND

Various electrical boxes for indoor and outdoor use are known. Electrical boxes can be single gang to accommodate one outlet or switch, or multi-gang to accommodate two or more outlets or switches.

Multi-gang boxes are generally arranged to position outlets or switches side-by-side. For example, the Hubbell HBL985 wall box is a two-gang box for delivering power, data, or AV side-by-side. These wall boxes are typically mounted with the outlets or switches facing outward from a wall. When outlets are side-by-side, one outlet may be blocked when an oversized plug is used. Further, it may be difficult to use outlets facing outward from a wall when they are located behind furniture or in tight spaces.

Some devices exist for mounting outlets on outdoor posts, however, most only accommodate single outlets our side-by-side outlets, such as B-K Lighting Receptacle Bollards and Legrand Outdoor Charging Stations. U.S. Pat. No. 7,234,670, assigned to Arlington Industries, describes one post that allows for outlets to be mounted opposite one another. However, the post is limited in its applications and cannot be mounted in different configurations.

The present invention solves these and other problems in the prior art.

SUMMARY

An object of the present invention is to provide an improved electrical box having a variety of electrical and data interface devices (i.e., outlets/receptacles, switches, etc.) positioned on opposite sides. A further object of the present invention is to provide an improved electrical box which can be mounted both vertically and horizontally.

In one exemplary embodiment according the present disclosure, an electrical box is provided including a central housing with a first side opening, a second side opening opposite the first side opening, and a rear opening, each of the first and second side openings configured to receive an electrical or data interface device, a first extension compartment around the first side opening, the first extension compartment including a first door, and a second extension compartment around the second side opening, the second extension compartment including a second door. In some embodiments, an exterior cover extends at least partially over the central housing, the first extension compartment, and the second extension compartment.

The first side opening may include a first electrical or data interface device and the second side opening may include a second (e.g., different) electrical or data interface device. In some embodiments, the first interface device is a high voltage electrical outlet or switch, and the second interface device is a low voltage data or audio/visual (AV) outlet.

The electrical box may have a rear side including the rear opening and a front side opposite the rear side, wherein the rear opening is configured to attach to a mount box. In some embodiments, each of the first and second doors are hingedly attached to edges of the front side. The mount box may be a multi-gang box or a single-gang mount box. When a single-gang mount box is used, the electrical box may include a mud ring at least partially closing the rear opening of the central housing around an opening of the single-gang mount box.

In some embodiments, the central housing includes a slot extending therethrough on the front side. A barrier may be positioned in the slot extending through the central housing and at least partially into the mount box. In some embodiments, the mount box is mounted in a wall and the electrical box is mounted against the wall. In some embodiments, the mount box is mounted on a top of a pedestal, and the electrical box is mounted against the top of the pedestal.

In another exemplary embodiment according the present disclosure, an electrical box is provided including a central housing with a first side opening, a second side opening opposite the first side opening, and a rear opening configured to attach to a mount box, each of the first and second side openings configured to receive an electrical or data interface device, a recess on a front side of the central housing including holes to receive fasteners for attaching the central housing to the mount box, and a slot in the recess extending into the central housing.

In some embodiments, a barrier extends through the slot and the rear opening at least partially into the mount box. A removable cover may be positioned within the recess.

The electrical box according to embodiments of the present disclosure is adapted to accommodate dual voltage and can be mounted in a vertical orientation (e.g., wall mounting) or a horizontal orientation (e.g., on a pedestal) on a standard single or two gang boxes. The electrical box is particularly suitable for outdoor applications, such as outside a home or business or in an outdoor recreational area such as a beach or park. For example, the electrical box may be mounted in the horizontal orientation in an outdoor recreational area or other public space for charging devices. The electrical box has indoor applications as well. For example, the electrical box can be used indoors for receptacles which are located behind beds to comply with NEC requirements (e.g., Article 210-60(b) of NEC 2014), such as in health care facilities. With the electrical box disclosed herein, a bed can be up against the box and the plug/receptacle connection is protected.

The electrical box according to the present disclosure provides consumers with the capability of installing multi-voltage devices with a provided barrier (e.g., mounted to Hubbell's two-gang box HBL985) or with single voltage devices where no barrier is required. If one power output is blocked by an oversize plug, the box provides consumers additional opportunity to use another side. In some embodiments, the electrical box includes a mud ring for power distribution applications.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
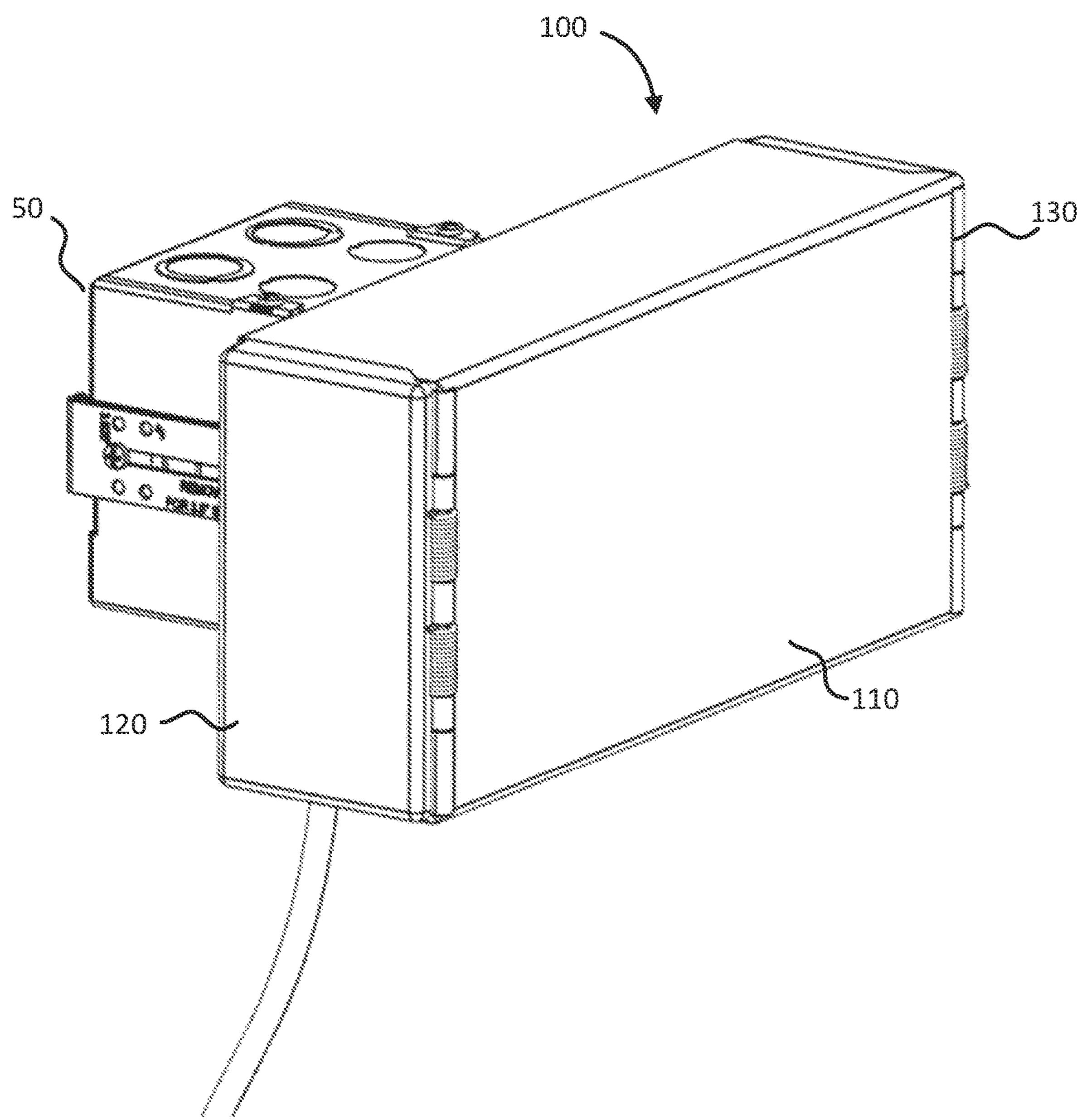
FIG. 1 is an isometric view of an electrical box according to an exemplary embodiment of the present disclosure mounted to a two-gang box.
Figure 2:
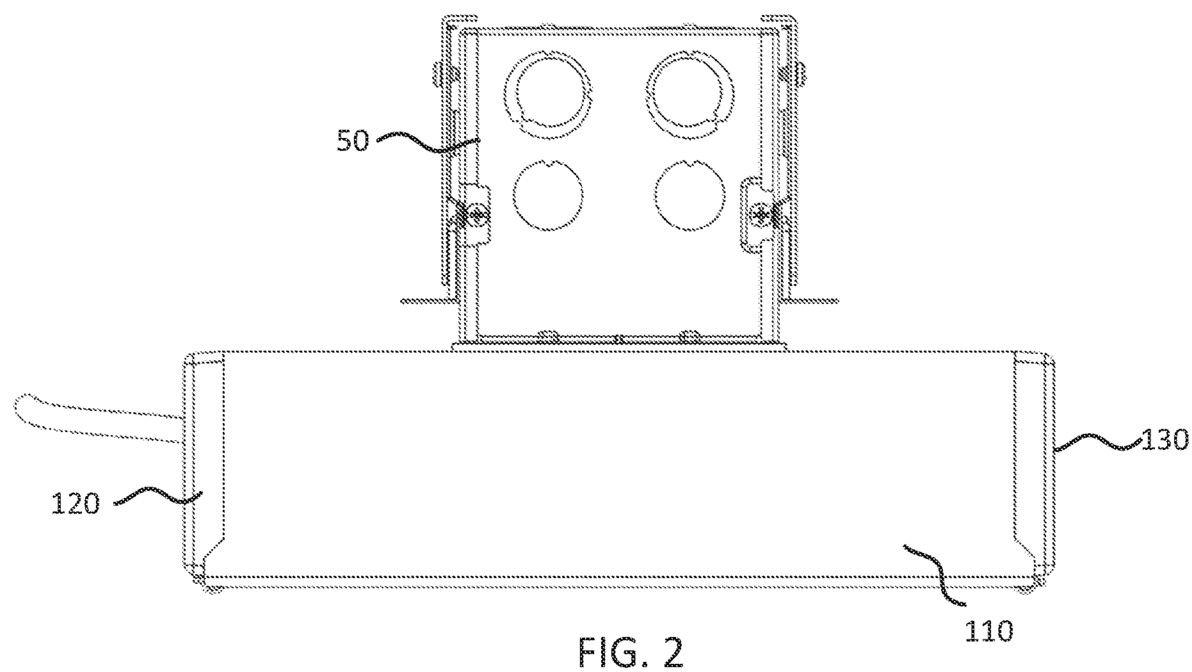
FIG. 2 is a top view of the electrical box shown in FIG. 1.
Figure 3:
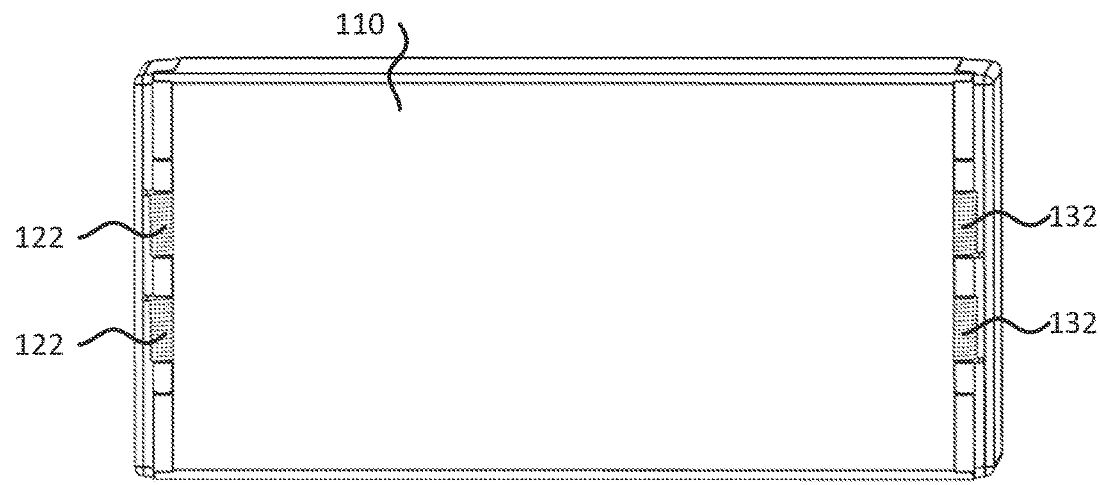
FIG. 3 is a front view of the electrical box shown in FIG. 1.

FIG. 1 shows an electrical box 100 according to an exemplary embodiment of the present disclosure mounted to a two-gang box 50. FIGS. 2 and 3 illustrate top and front views of the electrical box 100 shown in FIG. 1. The electrical box 100 has a rear side adjacent to the box 50, an opposite front side, and top and bottom sides. In this exemplary embodiment, the two-gang box 50 may be, for example, a Hubbell HBL985 or any other suitable multi-gang (e.g., two-gang) box. A further described below, the electrical box 100 may alternatively be mounted to a single-gang box (see FIGS. 13-16). The box 50 may be secured at least partially within a wall or pedestal.

The electrical box 100 may further include an exterior skin or cover 110, a first end with first door 120, and second end opposite the first end with a second door 130. The cover 110 extends over the front, top, and sides of the electrical box 100. The cover 110, and/or the doors 120,130 and other components of the electrical box 100, may be manufactured from a corrosion resistant metal such as aluminum (e.g., cast aluminum), stainless steel or other material suitable for outdoor use, or plastic or metal for indoor use. In some embodiments, the cover 110 can be different colors.

Figure 4:
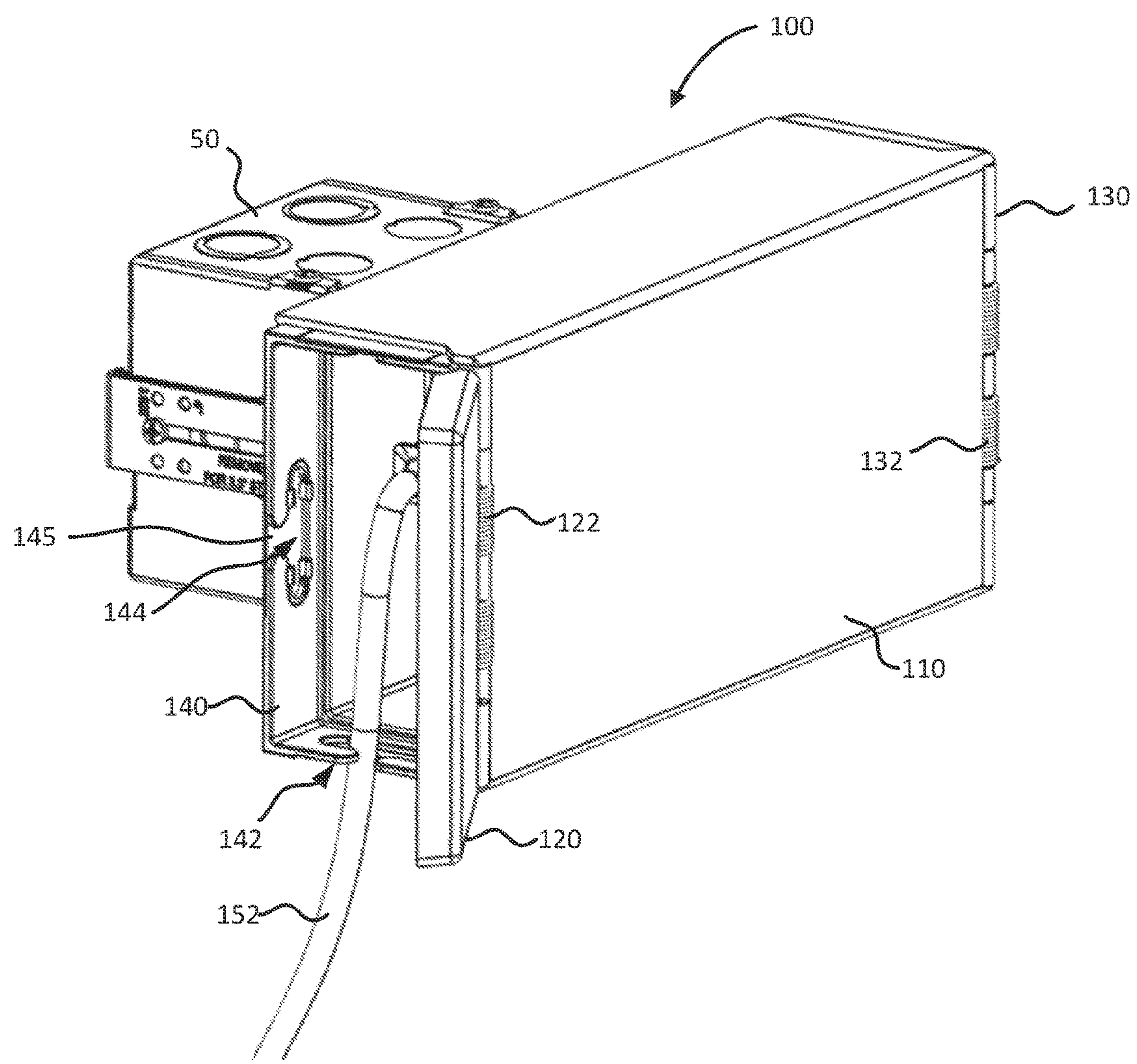
FIG. 4 is an isometric view of the electrical box shown in FIG. 1 with a first door in an open position.

As shown in FIGS. 3 and 4, the first and second doors 120,130 may be hingedly attached to the electrical box 100 and/or cover 110 with hinges including springs 122,132 to bias the doors 120,130 closed. Preferably the doors 120,130 are hinged at an outside edge at the front of the electrical box 100. Therefore, the doors 120,130 open from the wall outward when the electrical box 100 is vertically mounted, or upward from the ground when horizontally mounted, to protect the switch or outlets and the mating plugs or connector devices while in use from the elements.

As shown in FIG. 4, the electrical box 100 includes a first extension compartment 140 or recessed frame with an interior cavity exposed when the door 120 is opened. The first extension compartment 140 may include cable cutouts 142,144 on two or more of its sidewalls to route a cord 152 (having a plug 154) when the door 120 is fully closed. The electrical box 100 may include plugs 145 that snap into the cutouts 142,144 when not in use. A second extension compartment 160 (shown in FIGS. 8A-10) has the same features. The exterior cover 110 may also have corresponding tabs 112 that are removable (e.g., break off) to reveal the cutouts 142,144.

Figure 5A:
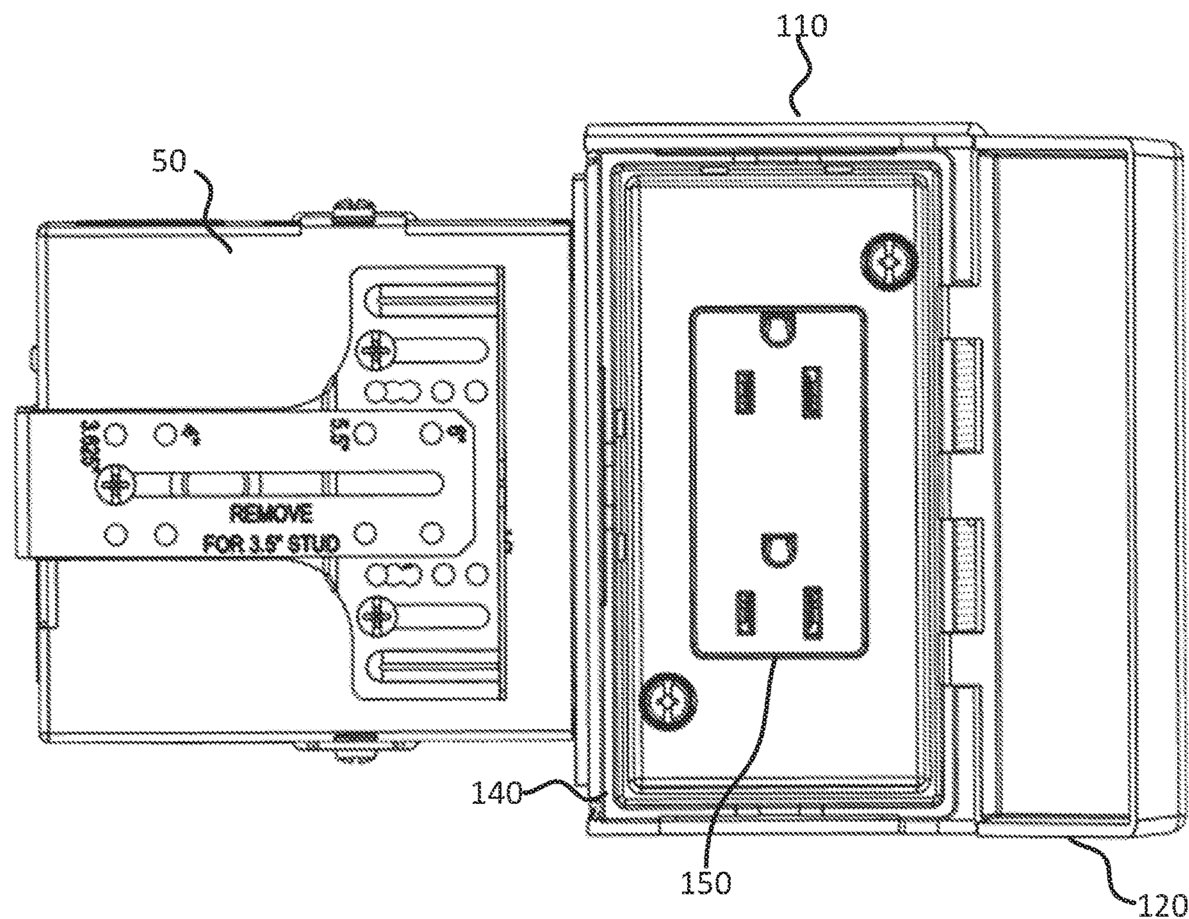
FIGS. 5A and 5B are side views of the electrical box shown in FIG. 1 with first and second doors in open positions.
Figure 5B:
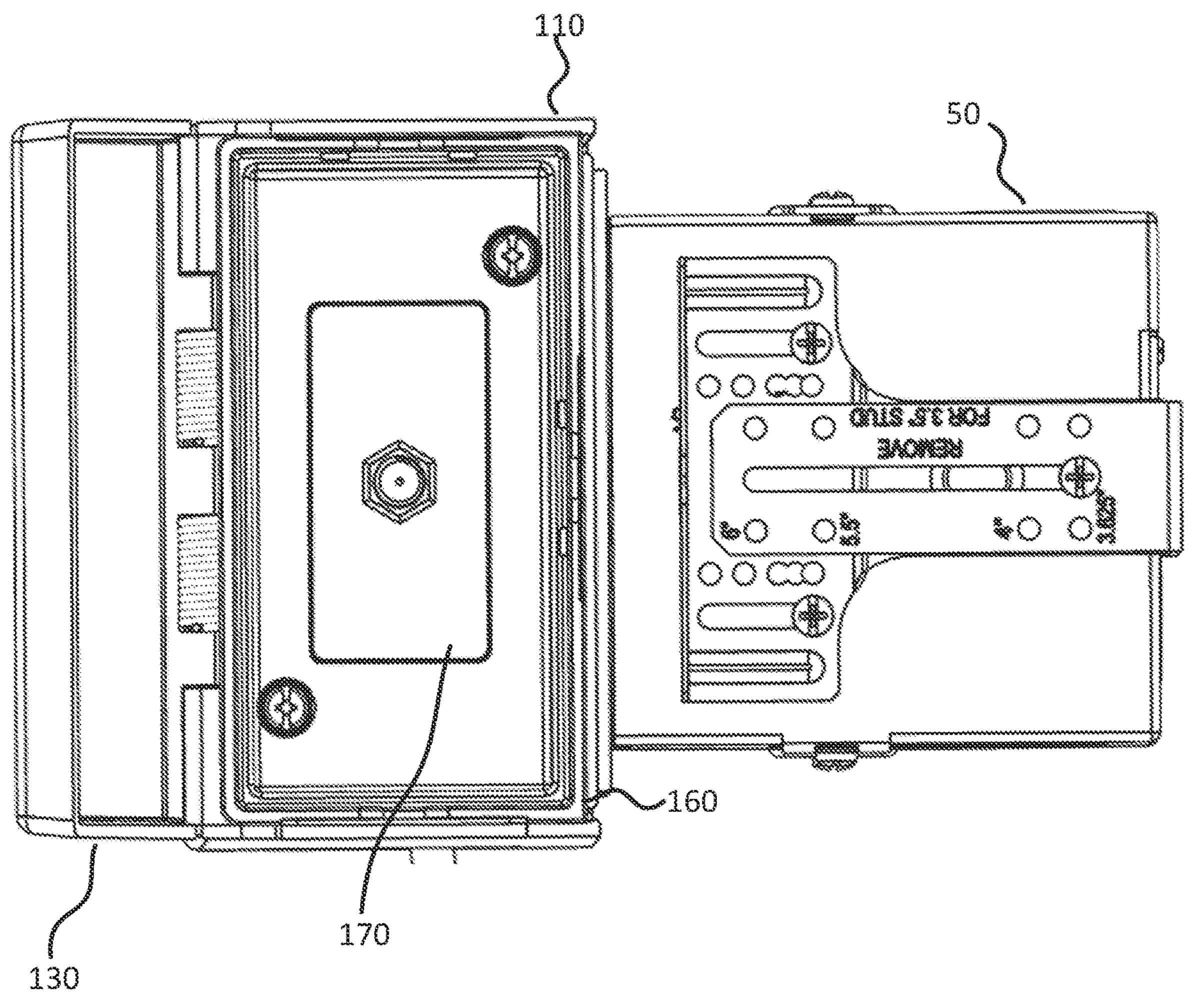

FIG. 5A is a side view of the first end of the electrical box 100 with the first door 120 in an open position. In the exemplary embodiment, the cavity of the first extension compartment 140 surrounds and encloses a high voltage electrical power outlet 150. FIG. 5B is a side view of the second end of the electrical box 100 with the second door 130 in an open position. In the exemplary embodiment, the cavity of the second extension compartment 160 surrounds and encloses a low voltage data or audio/visual (AV) outlet. The outlets shown herein are only exemplary. A variety of electrical and data interface devices may be installed in the electrical box 100. Examples include, without limitation, high voltage electrical power outlets, electrical switches, data, or audio/visual outlets (e.g., ethernet, coaxial, telephone, HDMI), and combined power and data outlets (e.g., USB, USB-C, etc.).

Figure 6:
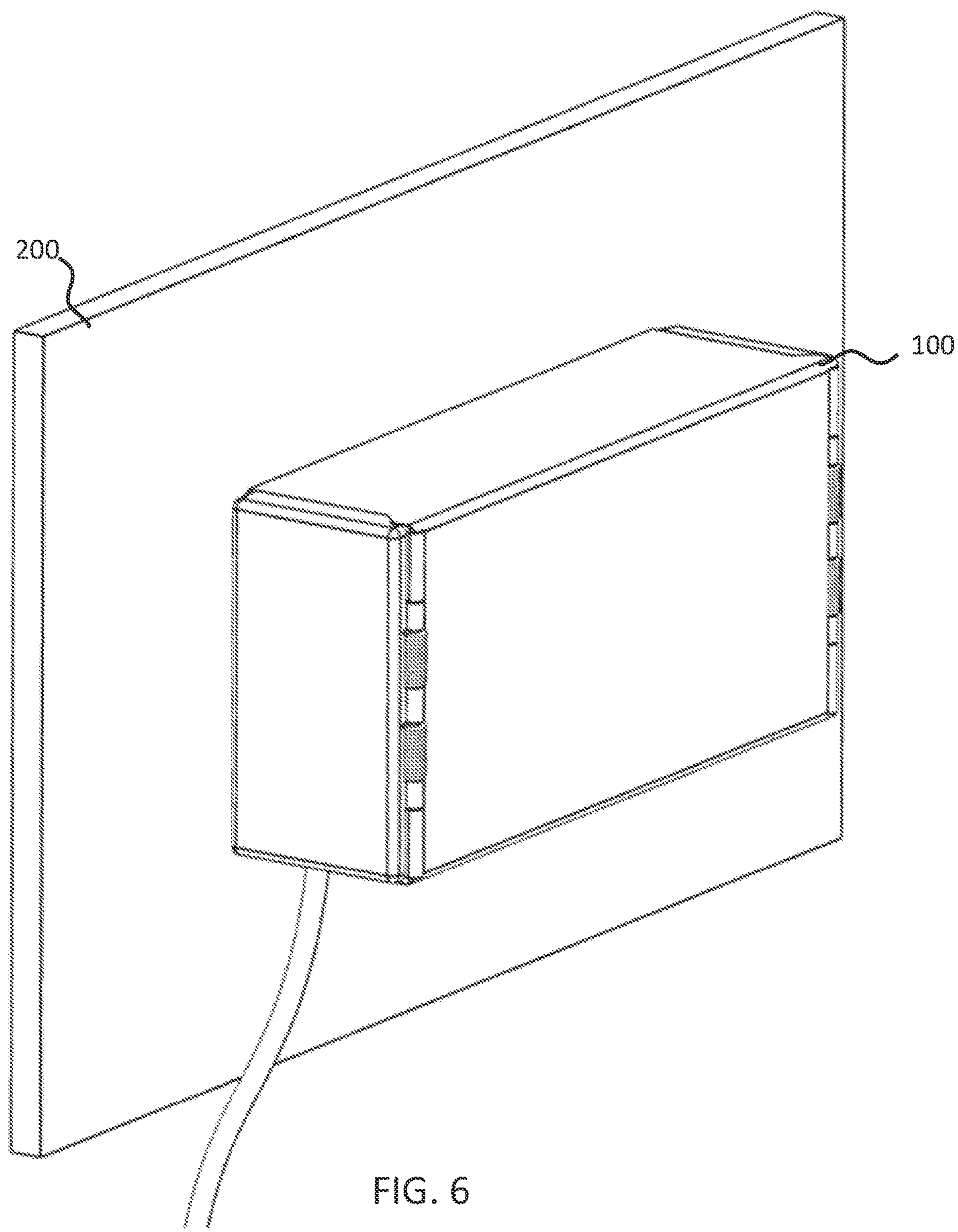
FIG. 6 is an isometric view of an electrical box according to an exemplary embodiment of the present disclosure mounted in a vertical configuration on a wall.
Figure 7:
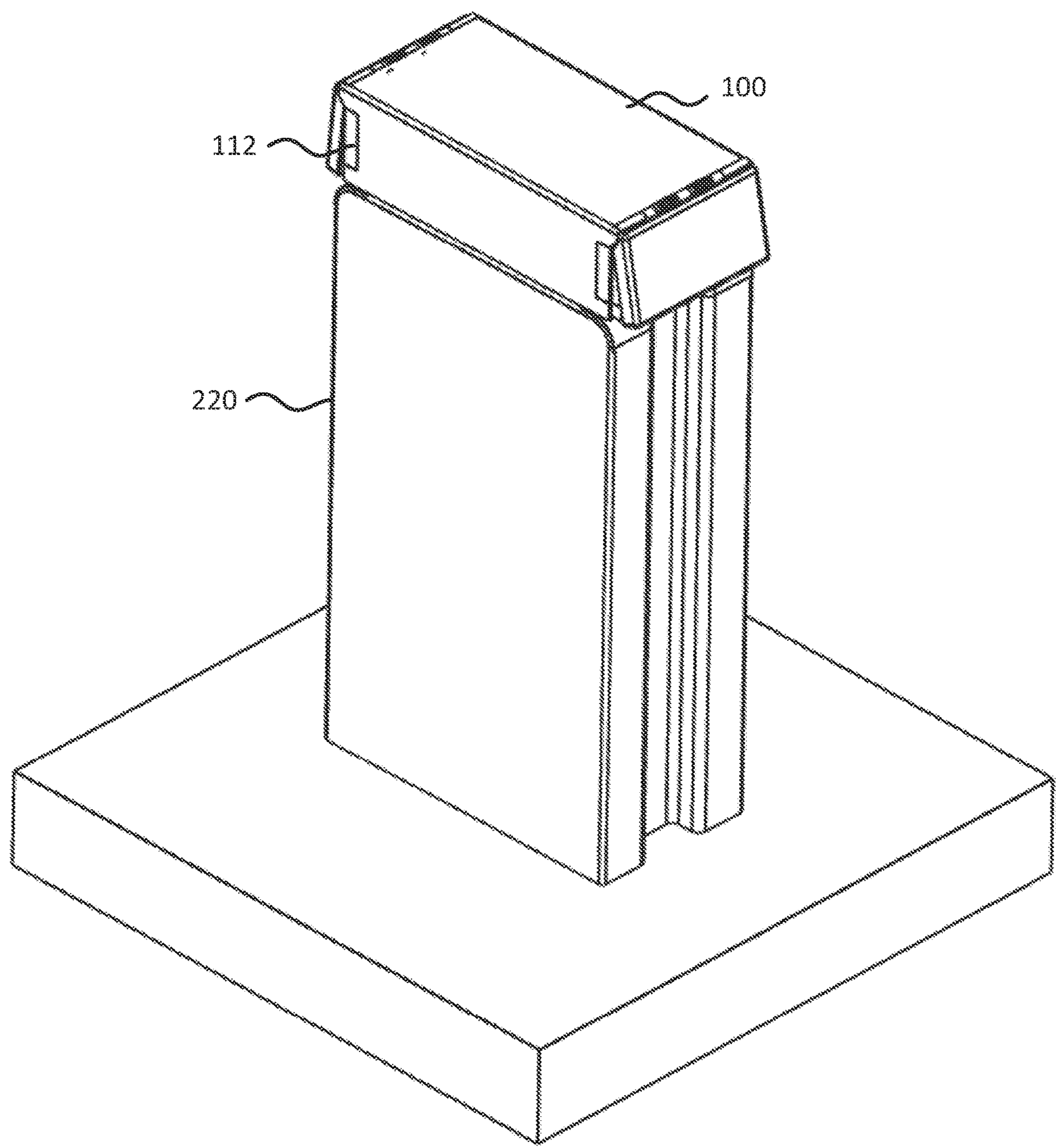
FIG. 7 is an isometric view of an electrical box according to an exemplary embodiment of the present disclosure mounted in a horizontal configuration on a pedestal.

The electrical box 100 according to an exemplary embodiment of the present disclosure may be mounted in vertical and horizontal configurations. FIG. 6 is an isometric view of the electrical box 100 mounted in a vertical configuration on a wall 200. The vertical configuration can, for example, be used indoors for receptacles which are located behind beds to comply with NEC requirements, such as in health care facilities. FIG. 7 is an isometric view of the electrical box 100 mounted in a horizontal configuration on top of a pedestal 220.

Figure 8A:
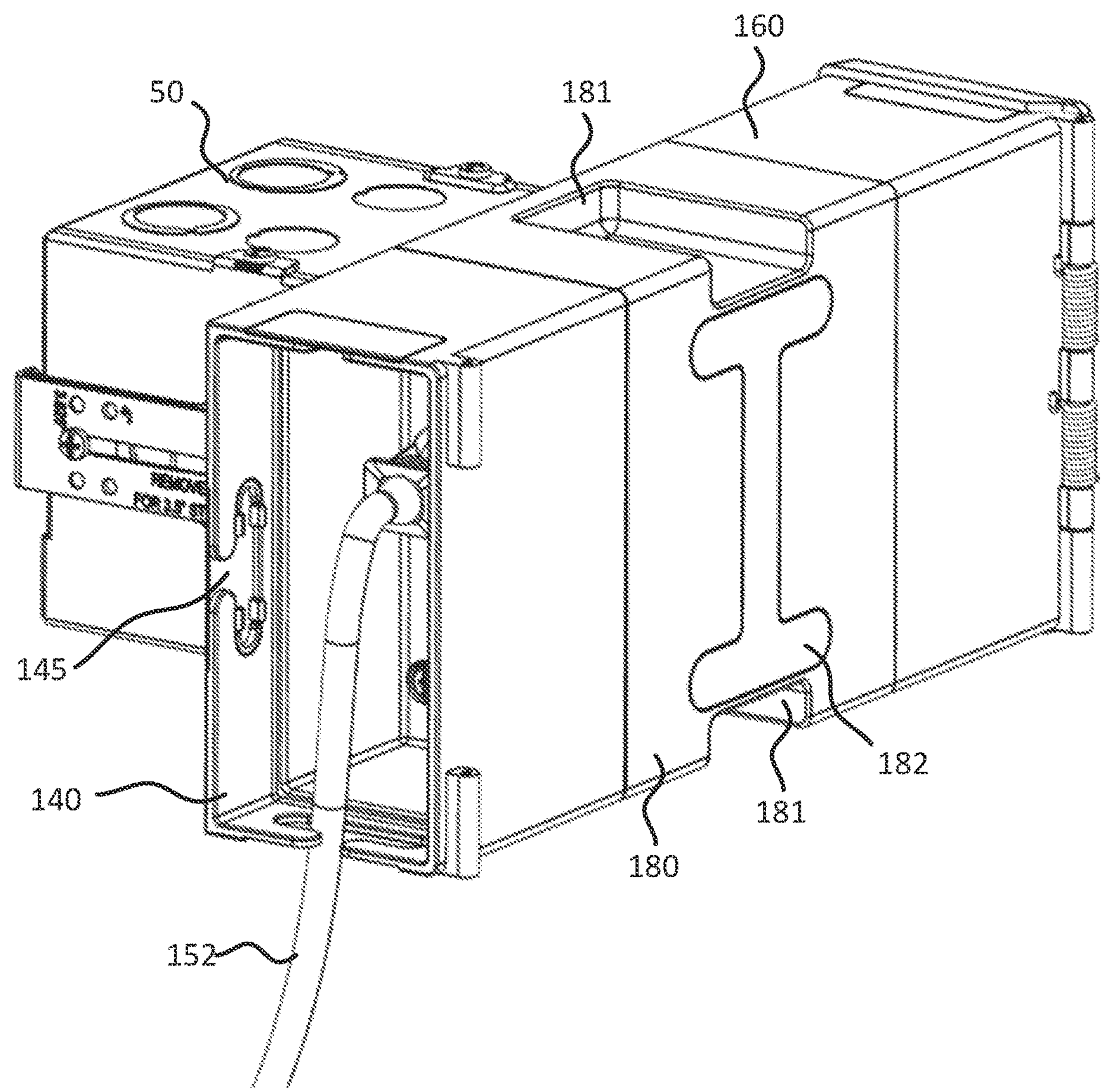
FIG. 8A is an isometric view of an electrical box according to an exemplary embodiment of the present disclosure mounted to a two-gang box with an exterior cover removed.

FIG. 8A is an isometric view of the electrical box 100 mounted to a two-gang box 50 with the exterior cover 110 removed to illustrate the internal components. The electrical box 100 includes a central back-to-back housing 180 with a first end and opening and a second opposite end and opening. The central housing 180 is secured to the box 50 with a gasket in between. Extension compartments 140,160 are secured over the outlets 150,170 and to respective ends of the central housing 180 with gaskets in between.

Figure 8B:
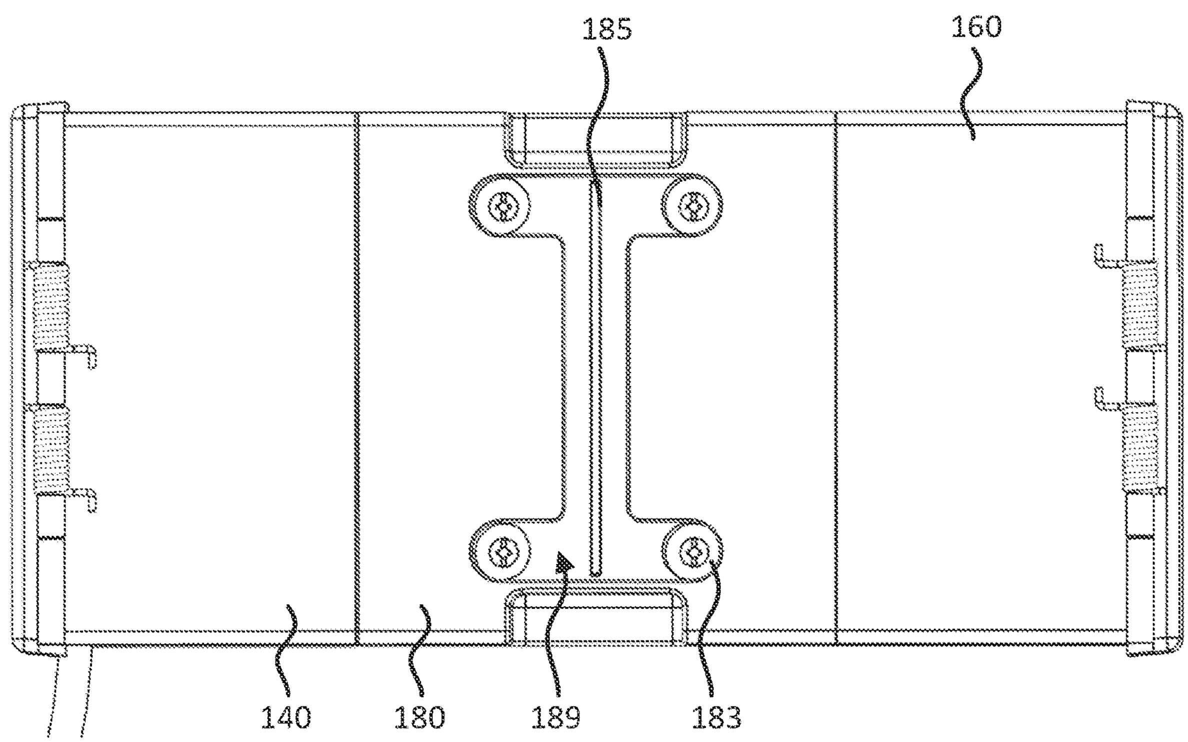
FIG. 8B is a front view of the electrical box shown in FIG. 8A with a slot cover removed.

The central housing 180 may have top and bottom cutouts 181 to reduce material and form a partial backstop on each side for outlets or switches. As shown in FIGS. 8A and 8B, the central housing 180 may also include a removable (e.g., snap in) cover 182 to allow access to a recess 189 with fasteners (e.g., four fasteners 183) for securing the central housing 180 to the box 50. FIG. 8B shows the electrical box 100 with the cover 182 removed. Removal of the cover 182 also reveals a vertical slot 185 in the recess 189 for the insertion and inspection of a barrier between the two outlets 150,170. The slot 185 extends into the central housing 180 allowing a barrier to be placed between the first and second side openings of the central housing 180 and out through the rear opening. As one skilled in the art will understand, a barrier is used particularly when the voltages are different between the two outlets 150,170, such as when one outlet 150 is high voltage electrical power and the other outlet 170 is low voltage data or audio/visual (AV).

Figure 9:
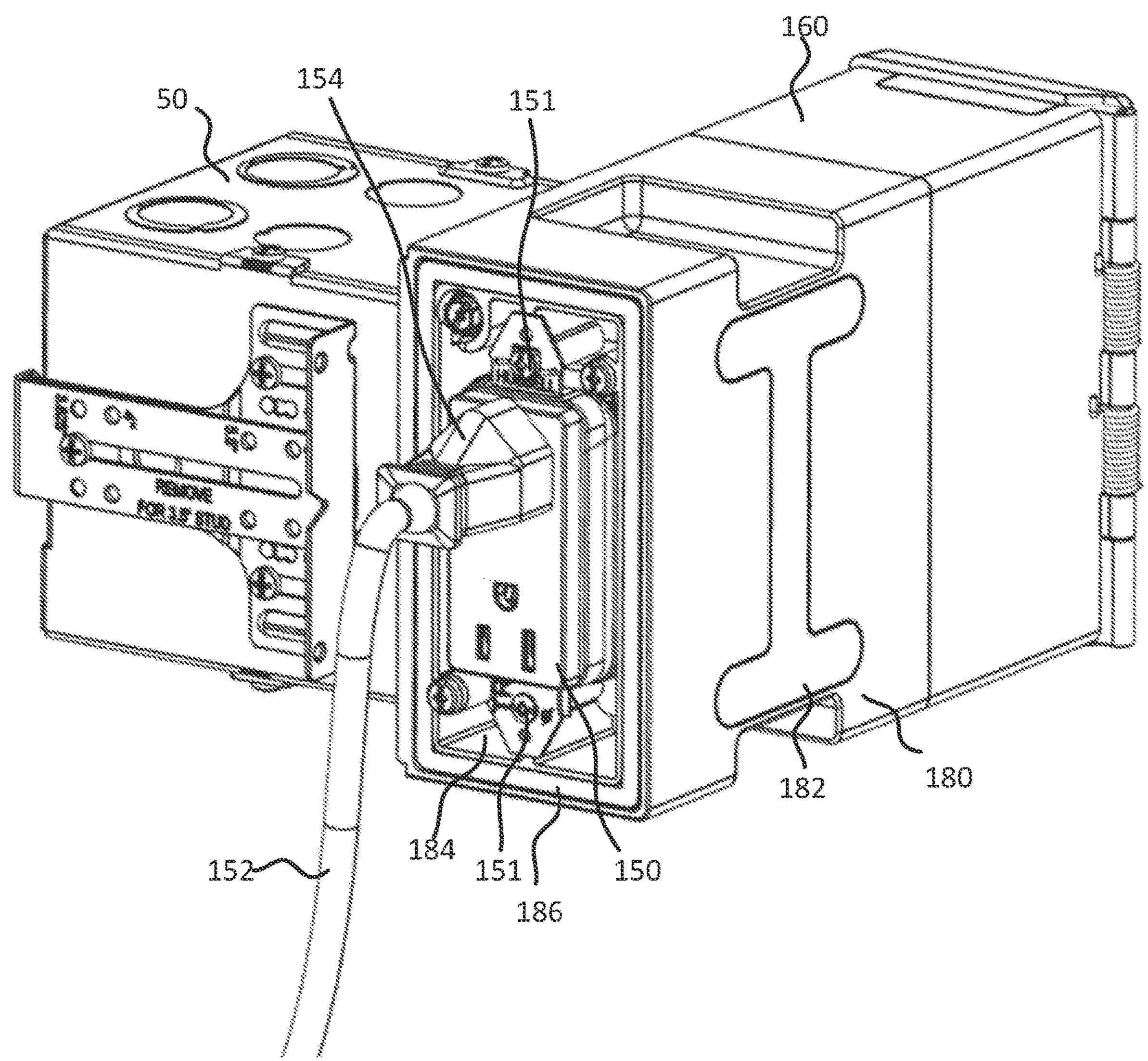
FIG. 9 is an isometric view of the electrical box shown in FIGS. 8A-8B with a first extension compartment removed.

FIG. 9 is an isometric view of the electrical box 100 shown in FIG. 8A with the first extension compartment 140 removed and a first side opening 184 of the central housing 180 exposed. The outlet 150 is secured into the first side opening 184 of the central housing 180. The central housing 180 includes connection mechanisms, such as threaded holes 188 (see FIG. 11), to receive fasteners 151 (e.g., screws) to attach the outlets 150,170. A gasket 186 is positioned around the first side opening 184 of the central housing 180.

Figure 10:
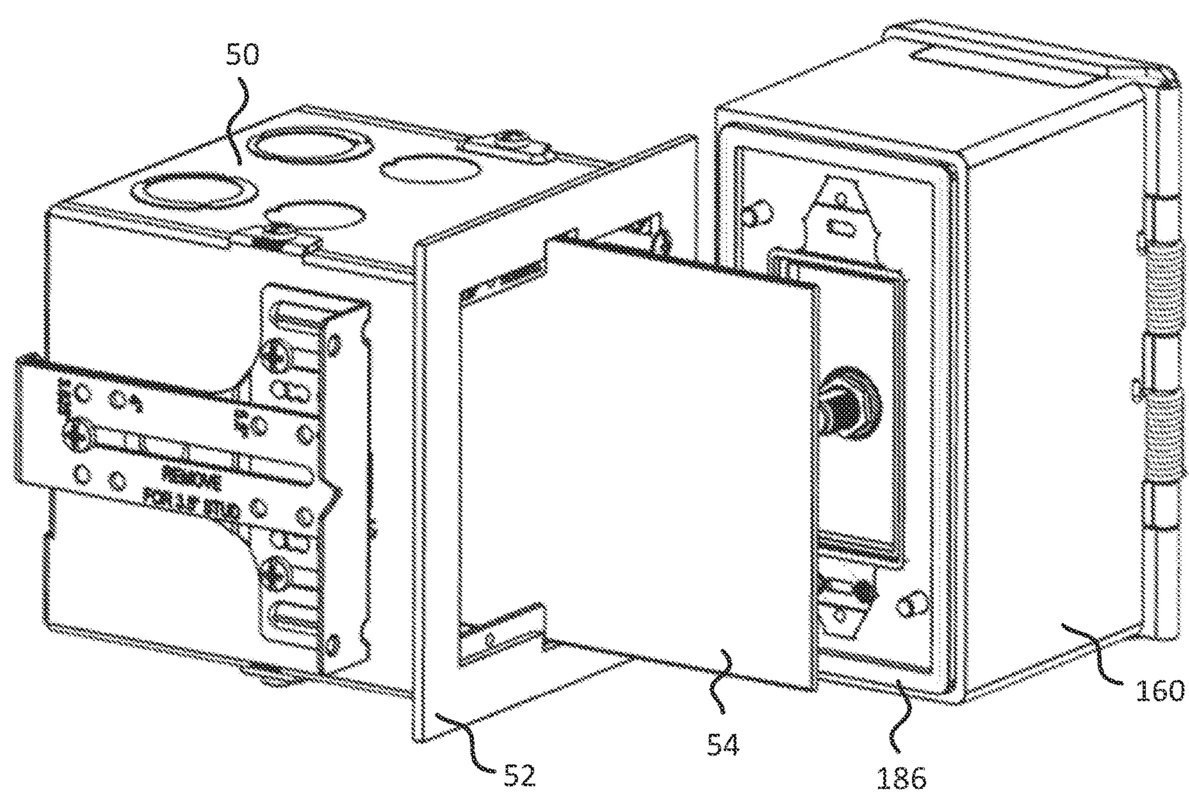
FIG. 10 is an isometric view of the electrical box shown in FIG. 9 with a central housing removed.

FIG. 10 is an isometric view of the electrical box 100 shown in FIG. 9 with a central housing 180 removed. The gasket 52 between the central housing 180 and the box 50 is shown. A gasket 186 positioned around a second side opening (opposite the first side opening 184) of the central housing 180 is also shown. A barrier 54 extends between the first and second outlets 150,170 and into the box 50. The barrier 54 may be inserted and inspected via the slot 185 behind the removable cover 182.

Figure 11:
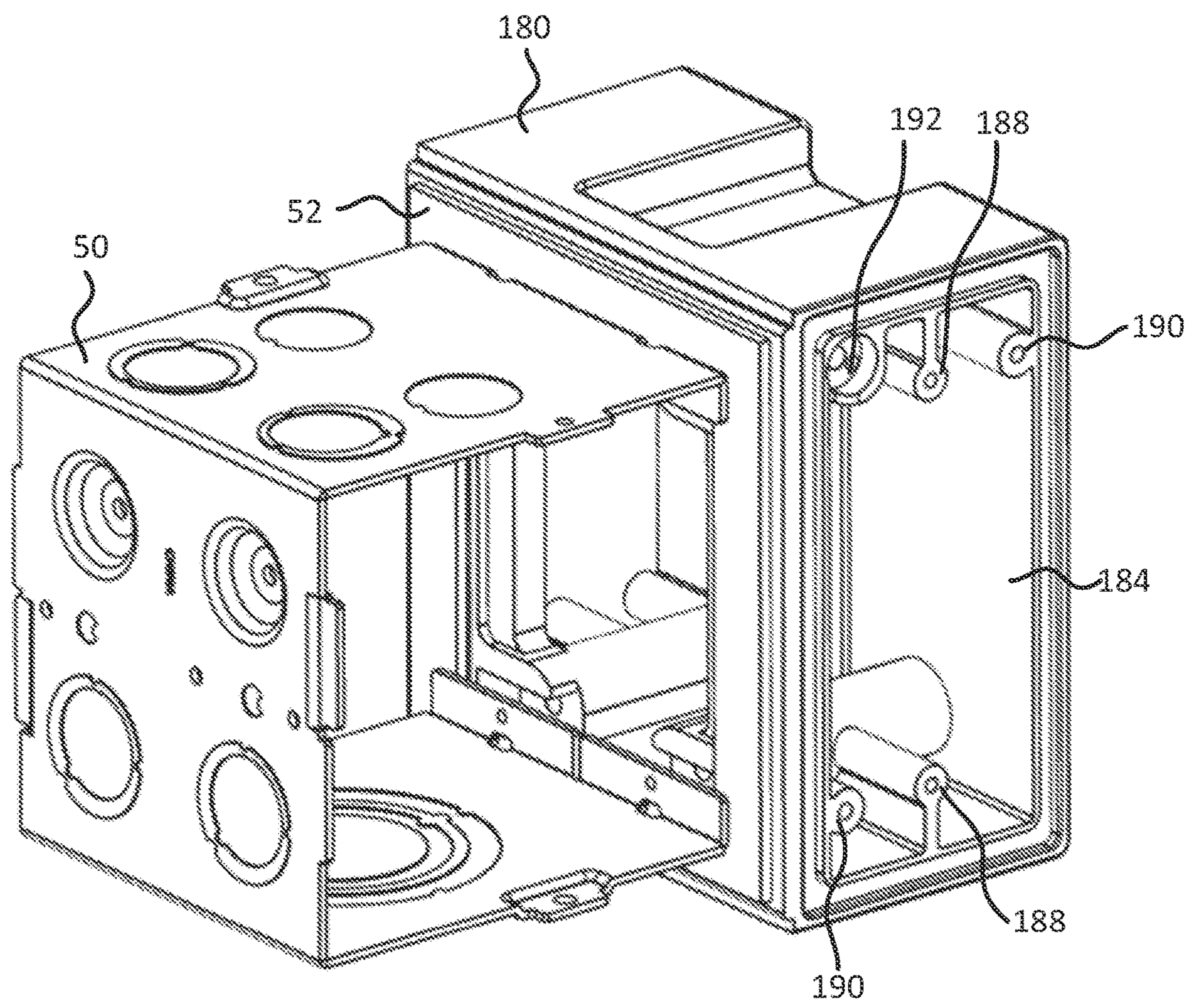
FIG. 11 is a rear isometric view of a central housing of an electrical box according to an exemplary embodiment of the present disclosure mounted to a two-gang box.
Figure 12:
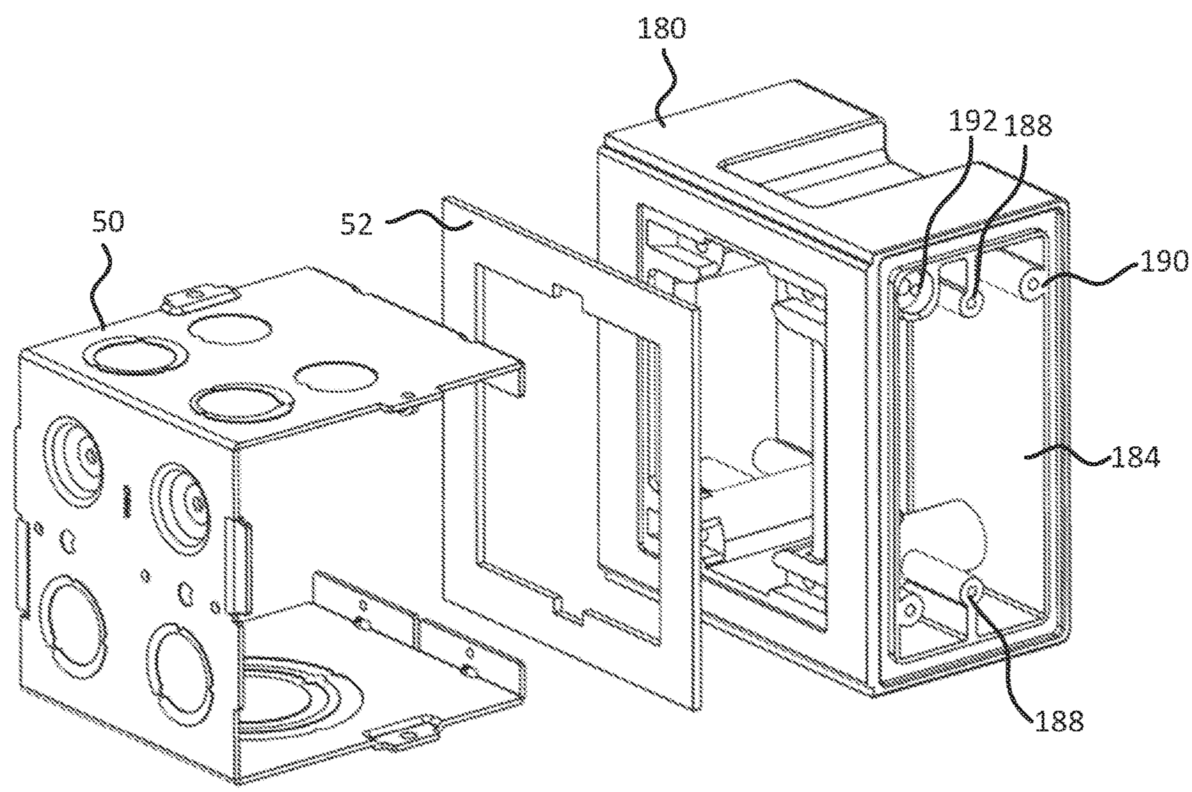
FIG. 12 is an exploded view of the central housing and the two-gang box shown in FIG. 11.

FIG. 11 is a rear isometric view of the central housing 180 of the electrical box 100 mounted to a two-gang box 50, with sidewalls of the box 50 removed for clarity. FIG. 12 is an exploded view of the central housing 180 and the two-gang box 50 shown in FIG. 11. The central housing 180 includes a rear opening engaging with the box 50. The gasket 52 surrounds the rear opening of the central housing 180. Each side of the central housing 180 has two or more holes 188 for receiving fasteners 151 to attach the outlet 150 (or other electrical or data interface device). The central housing 180 also includes holes 190 for receiving fasteners to attach the extension compartment 140 to the central housing 180. There may also be a hole 192 for receiving a grounding fastener.

Figure 13:
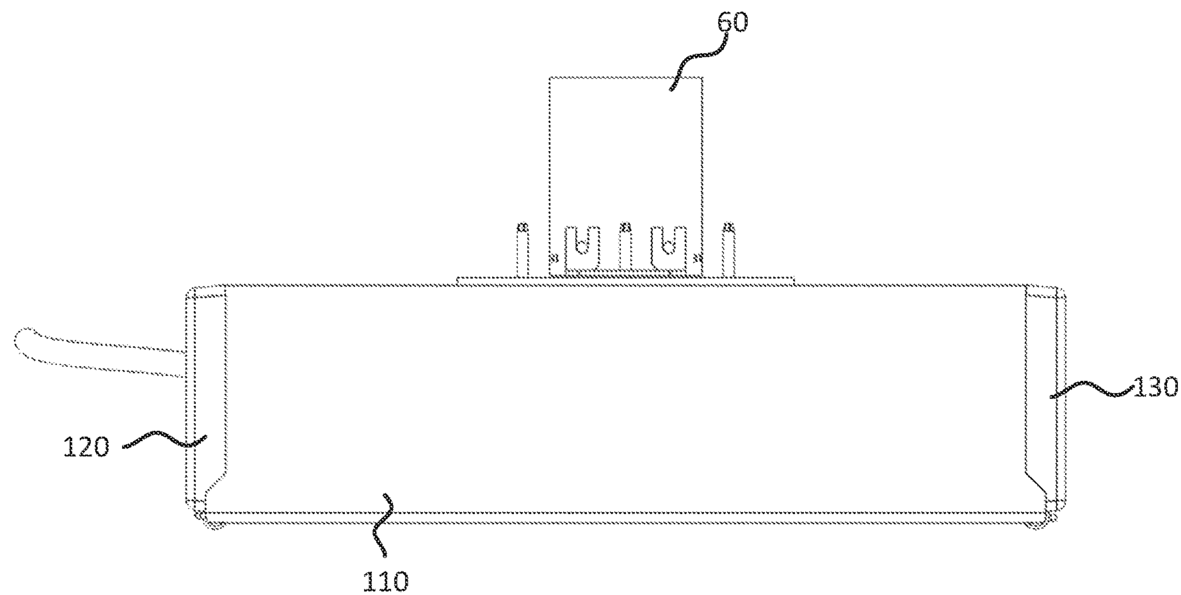
FIG. 13 is a top view of an electrical box according to an exemplary embodiment of the present disclosure mounted to a single-gang box.
Figure 14:
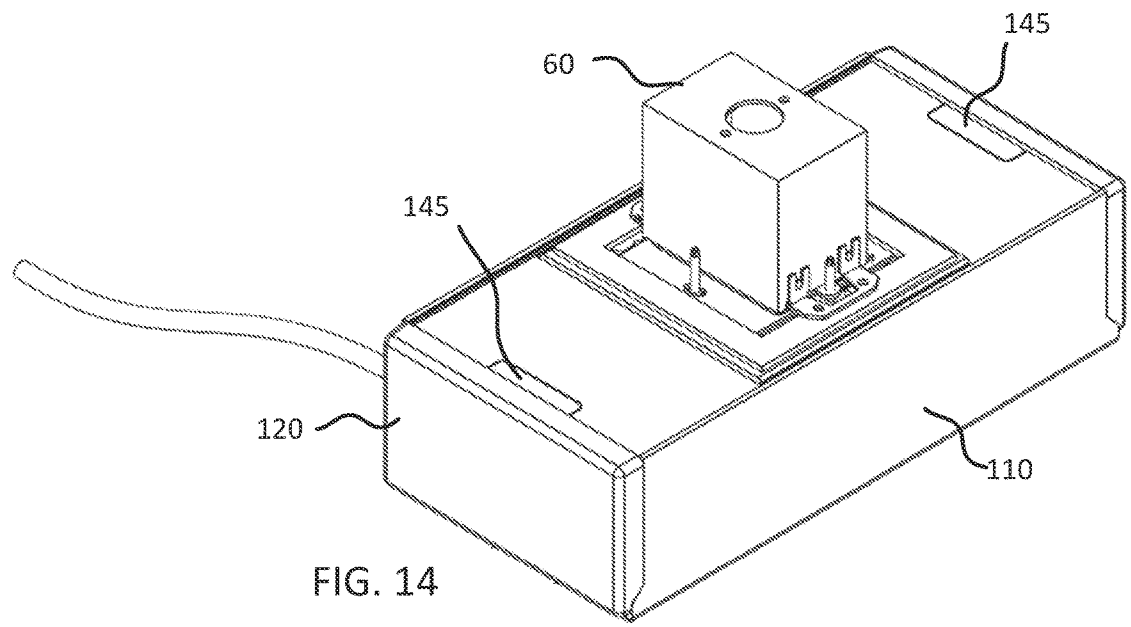
FIG. 14 is a rear isometric view of the electrical box shown in FIG. 13.

As discussed above, the electrical box 100 may be mounted to a single or multi-gang boxes. FIG. 13 is a top view of an electrical box 100 according to an exemplary embodiment of the present disclosure mounted to a single-gang box 60. FIG. 14 is a rear isometric view of the electrical box 100 shown in FIG. 13.

Figure 15:
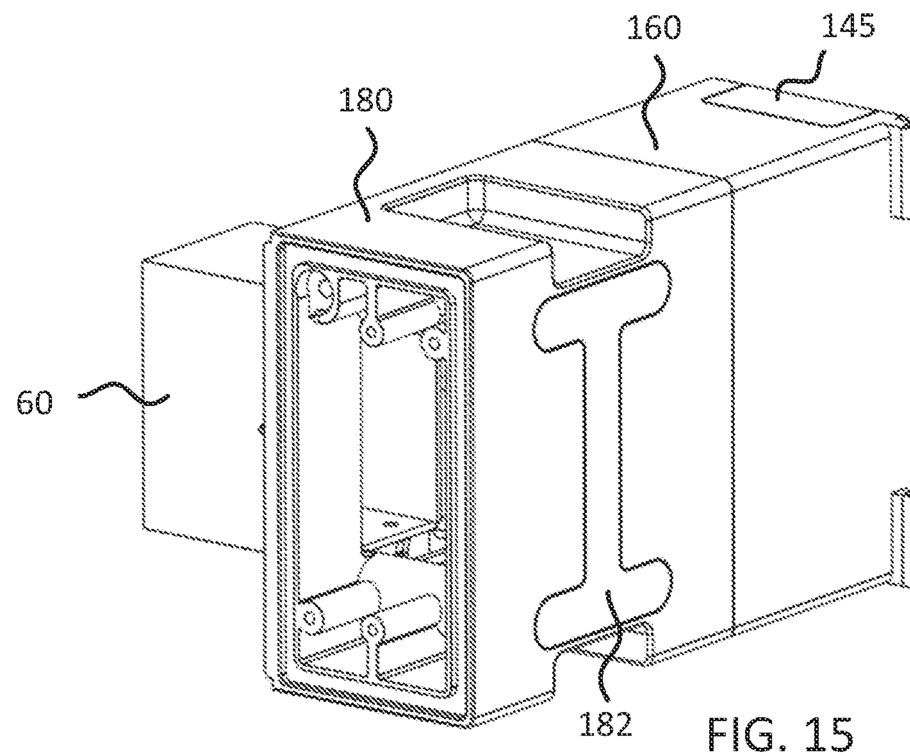
FIG. 15 is an isometric view of the electrical box shown in FIG. 13 with an exterior cover and a first extension compartment removed.
Figure 16:
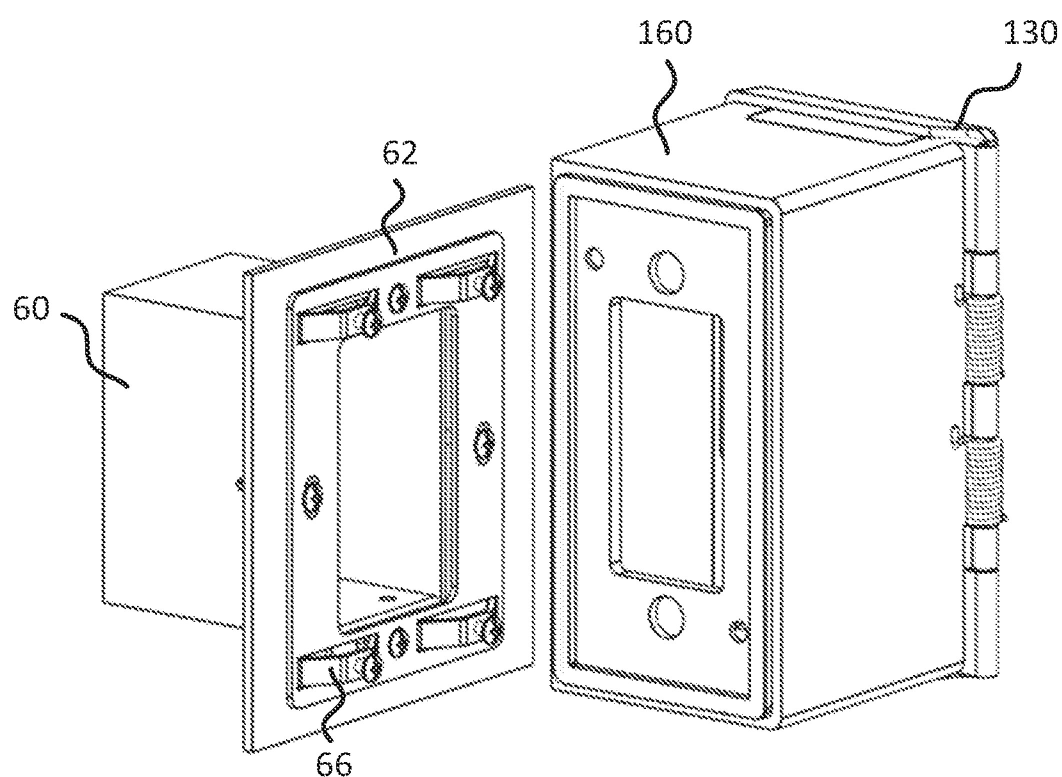
FIG. 16 is an isometric view of the electrical box shown in FIG. 15 with a central housing removed.

FIGS. 15 and 16 are isometric views of the electrical box 100 shown in FIG. 13 with portions removed to illustrate the internal components. The same central housing 180 may be used for a single-gang box 60 and secured together with fasteners under a removable cover 182. A gasket 62 is positioned between the box 60 and the central housing 180. Further, when a single-gang box 60 is used, an optional mud ring 66 may be provided to close the opening, at least partially, between the box 60 and the rear opening of the central housing 180.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box, comprising:

a central housing with a first side opening, a second side opening opposite the first side opening, and a rear opening, each of the first and second side openings is configured to receive an electrical or data interface device;

a first extension compartment around the first side opening, said first extension compartment including a first door;

a second extension compartment around the second side opening, said second extension compartment including a second door; and an exterior cover extending at least partially over said central housing, said first extension compartment, and said second extension compartment.

2. The electrical box of claim 1, wherein the first side opening includes a first electrical or data interface device and the second side opening includes a second electrical or data interface device, wherein the first electrical or data interface device is a high voltage electrical outlet or switch and the second electrical or data interface device is a low voltage data or audio/visual (AV) outlet.

3. The electrical box of claim 1, wherein each of said first and second extension compartments are removably attached to said central housing.

4. The electrical box of claim 1, wherein each of the first and second doors are hingedly attached to the electrical box.

5. The electrical box of claim 1, comprising a rear side including the rear opening and a front side opposite the rear side, wherein the rear side is configured to attach to a mount box.

6. The electrical box of claim 5, wherein each of the first and second doors are hingedly attached to edges of the front side.

7. The electrical box of claim 5, wherein said exterior cover extends over the front side, a bottom side, and a top side of the electrical box.

8. The electrical box of claim 5, wherein the mount box is a two-gang mount box.

9. The electrical box of claim 5, wherein the mount box is a single-gang mount box.

10. The electrical box of claim 9, further comprising a mud ring at least partially closing the rear opening of said central housing around an opening of the single-gang mount box.

11. The electrical box of claim 5, wherein said central housing includes a slot extending therethrough on the front side.

12. The electrical box of claim 11, further comprising a barrier in the slot extending through said central housing and at least partially into the mount box.

13. The electrical box of claim 5, wherein the mount box is mounted in a wall, and wherein the electrical box is mounted against the wall.

14. The electrical box of claim 5, wherein the mount box is mounted on a top of a pedestal, and wherein the electrical box is mounted against the top of the pedestal.

15. The electrical box of claim 1, wherein at least one of said first and second extension compartments includes a cable cutout on each of at least two sides of the at least one of said first and second extension compartments.

16. The electrical box of claim 15, wherein the at least one of said first and second extension compartments includes a removable plug closing at least one of the cable cutouts.

17. An electrical box, comprising:

a central housing with a first side opening, a second side opening opposite the first side opening, and a rear opening configured to attach to a mount box, each of the first and second side openings configured to receive an electrical or data interface device;

a recess on a front side of said central housing, between the first side opening and the second side opening, including holes to receive fasteners for attaching said central housing to the mount box; and a slot in said recess extending into said central housing between the first side opening and the second side opening.

18. The electrical box of claim 17, further comprising a barrier extending through the slot and the rear opening at least partially into the mount box.

19. The electrical box of claim 18, wherein the first side opening includes a first electrical or data interface device and the second side opening includes a second electrical or data interface device, wherein the first electrical or data interface device is a high voltage electrical outlet or switch and the second electrical or data interface device is a low voltage data or audio/visual (AV) outlet.

20. The electrical box of claim 17, further comprising a removable cover within the recess.

21. An electrical box, comprising:

a central housing with a first side opening, a second side opening opposite the first side opening, and a rear opening configured to attach to a mount box, each of the first and second side openings configured to receive an electrical or data interface device;

a recess on a front side of said central housing including holes to receive fasteners for attaching said central housing to the mount box;

a slot in said recess extending into said central housing; and a first extension compartment removably attachable to said central housing around the first side opening, said first extension compartment including a first door, and a second extension compartment removably attachable to said central housing around the second side opening, said second extension compartment including a second door.

22. The electrical box of claim 21, further comprising a gasket between each of said first and second extension compartments and said central housing.

23. The electrical box of claim 21, further comprising an exterior cover extending at least partially over said central housing, said first extension compartment, and said second extension compartment.

* * * * *